(12) United States Patent
Reid

(10) Patent No.: US 9,489,550 B2
(45) Date of Patent: Nov. 8, 2016

(54) POSITIONING SYSTEMS AND METHODS

(71) Applicant: The Boeing Company, Chicago, IL (US)

(72) Inventor: Eric M. Reid, Kenmore, WA (US)

(73) Assignee: The Boeing Company, Chicago, IL (US)

( * ) Notice: Subject to any disclaimer, the term of this patent is extended or adjusted under 35 U.S.C. 154(b) by 285 days.

(21) Appl. No.: 13/916,439

(22) Filed: Jun. 12, 2013

(65) Prior Publication Data

US 2014/0368316 A1   Dec. 18, 2014

(51) Int. Cl.
  *G06K 7/10* (2006.01)
  *B23Q 9/00* (2006.01)
  *B23Q 17/22* (2006.01)

(52) U.S. Cl.
  CPC ......... *G06K 7/10366* (2013.01); *B23Q 9/0042* (2013.01); *B23Q 17/2233* (2013.01)

(58) Field of Classification Search
  CPC .. G06Q 10/087; G06Q 10/08; G06K 7/0008; G06K 2017/0045; G06K 19/0723; G08B 13/2462; G08B 13/2417
  USPC .......... 340/1.1, 6.1, 8.1, 10.1–10.6, 340/572.1–572.9
  See application file for complete search history.

(56) References Cited

U.S. PATENT DOCUMENTS

| | | | | |
|---|---|---|---|---|
| 3,842,744 A * | 10/1974 | Vis | ............ | B07C 3/005 |
| | | | | 104/88.03 |
| 4,864,776 A * | 9/1989 | Morrison | ............ | B23Q 35/12 |
| | | | | 451/10 |
| 5,012,749 A * | 5/1991 | Passage, Jr. | .......... | B61L 23/005 |
| | | | | 104/297 |
| 2007/0031217 A1 | 2/2007 | Sharma | | |
| 2007/0192133 A1* | 8/2007 | Morgan | ............ | G06F 19/321 |
| | | | | 705/2 |
| 2010/0289627 A1* | 11/2010 | McAllister | ........... | G06Q 10/087 |
| | | | | 340/10.42 |
| 2011/0084841 A1* | 4/2011 | Gyorfi | ............ | H04B 5/0062 |
| | | | | 340/572.4 |
| 2012/0007716 A1* | 1/2012 | Lee | ............ | G01S 5/14 |
| | | | | 340/10.4 |
| 2013/0060520 A1* | 3/2013 | Amor | ............ | G01S 5/0018 |
| | | | | 702/154 |
| 2013/0226340 A1* | 8/2013 | Buchstab | ............ | B25J 5/04 |
| | | | | 700/245 |

FOREIGN PATENT DOCUMENTS

| | | |
|---|---|---|
| DE | 20 2012 005284 U1 | 6/2012 |
| EP | 1 577 188 A2 | 9/2005 |
| EP | 2 384 842 A1 | 11/2011 |
| WO | WO 2005 023485 A1 | 3/2005 |
| WO | WO 2012 079600 A1 | 6/2012 |

OTHER PUBLICATIONS

Electroimpact Flex Track Drilling System Overview, http://www.electroimpact.com, 2013.
International Search Report and Written Opinion for Application No. PCT/US2014/035628, mailed Aug. 4, 2014, 10 pages.
PCT International Preliminary Report on Patentability for Application No. PCT/US2014/035628, issued Dec. 15, 2015; 5 pages.

* cited by examiner

*Primary Examiner* — James Yang
(74) *Attorney, Agent, or Firm* — Toler Law Group, PC

(57) ABSTRACT

Manufacturing systems and methods are disclosed. In one example, a system includes a track to be positioned proximate a structure. The track has a length extending along an axis and a location indicator positioned along the length of the track. The location indicator provides a unique tag which identifies a location of the location indicator along the first axis.

20 Claims, 5 Drawing Sheets

POSITIONING SYSTEMS AND METHODS

BACKGROUND

The subject matter described herein relates to manufacturing techniques and, more particularly, to systems and methods to position machine tools in a three-dimensional space.

Various manufacturing environments utilize machine tools which are moveable, commonly along a track, in relation to a work piece. By way of example, in aircraft production environments, one or more machine tools may be mounted onto a track, which is mounted onto or proximate an aircraft component. The one or more machine tools may move along the track to perform operations on the work piece.

The one or more machine tools must be positioned accurately to ensure that machining operations are performed in correct locations on the work piece. Accordingly, systems and methods to position machine tools may find utility, e.g., in production environments.

SUMMARY

It is desirable to provide systems and methods to accurately position machine tools.

In one example, a system includes a track to be positioned proximate a structure. The track has a length extending along a first axis and a location indicator positioned along the length of the track. The location indicator provides a unique tag which identifies a location of the location indicator along the first axis.

In another example, a method includes securing a track to a structure. The track has a length, extending along a first axis, and a location indicator, positioned along the length of the track. The location indicator provides a unique tag which identifies a location of the location indicator along the first axis. The method also includes engaging at least one machine tool with the track and positioning the machine tool in a predetermined location on the track with respect to the location indicator.

In another example, a computer program product includes logic instructions stored in a non-transitory computer readable medium. The logic instructions, when executed by a processor, configure the processor to position a machine tool in a predetermined location on a track with respect to an radio frequency identification (RFID) device by performing operations comprising detecting, with an RFID detector, a first location of a first boundary of the RFID device, detecting, with the RFID detector, a second location of a second boundary of the RFID device, locating a center point of the RFID device between the first location and the second location and positioning the machine tool at the center point of the RFID device.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

Examples of methods and systems in accordance with the teachings of the present disclosure are described in detail below with reference to the following drawings.

DETAILED DESCRIPTION

In the following description, numerous specific details are set forth in order to provide a thorough understanding of various aspects of the disclosure. However, various examples of the disclosure may be practiced without these specific details. In other instances, well-known methods, procedures, components, and circuits have not been described in detail so as not to obscure the particular examples of the disclosure. Further, various aspects of the disclosure may be performed using various means, such as integrated semiconductor circuits ("hardware"), computer-readable instructions organized into one or more programs ("software"), or some combination of hardware and software. For the purposes of this disclosure, reference to "logic" shall mean either hardware, software, or some combination thereof.

Systems and methods to position machine tools are described herein. In some examples, systems and methods described herein may be used in the manufacture of parts in vehicles such as aircraft, ships, automobiles, or other structures. By way of example, aircraft structures commonly include a skin formed from aluminum, metal, or composite materials attached to an underlying frame structure. Machine tools may be positioned proximate the structures and may be moveable along a track system to perform machining operations in predetermined locations on the structures.

Figure 1:
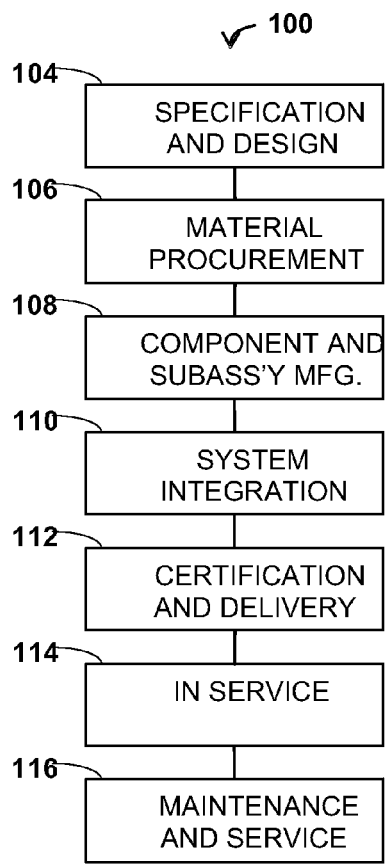
FIG. 1 is a flow diagram of aircraft production and service methodology.
Figure 2:
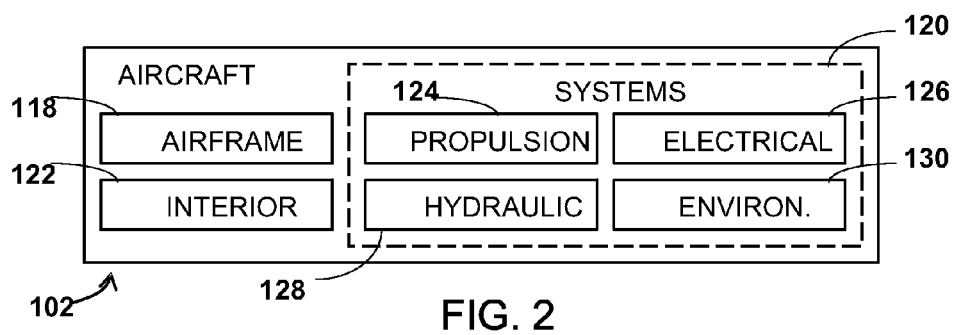
FIG. 2 is a block diagram of an aircraft.

Referring more particularly to the drawings, aspects of the disclosure may be described in the context of an aircraft manufacturing and service method 100 as shown in FIG. 1 and an aircraft 102 as shown in FIG. 2. During pre-production, illustrative method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 102 produced by illustrative method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries, such as the automotive industry.

Apparatus and methods embodied herein may be employed during one or more of the stages of the production and service method 100. For example, components or subassemblies corresponding to production process 108 may be fabricated or manufactured in a manner similar to components or subassemblies produced while the aircraft 102 is in service. Also, one or more apparatus examples, method examples, or a combination thereof may be utilized during the production stages 108 and 110, for example, by substantially expediting assembly of, or reducing the cost of, the aircraft 102. Similarly, one or more of apparatus examples, method examples, or a combination thereof may be utilized while the aircraft 102 is in service, for example and without limitation, for maintenance and service 116.

Figure 3A:
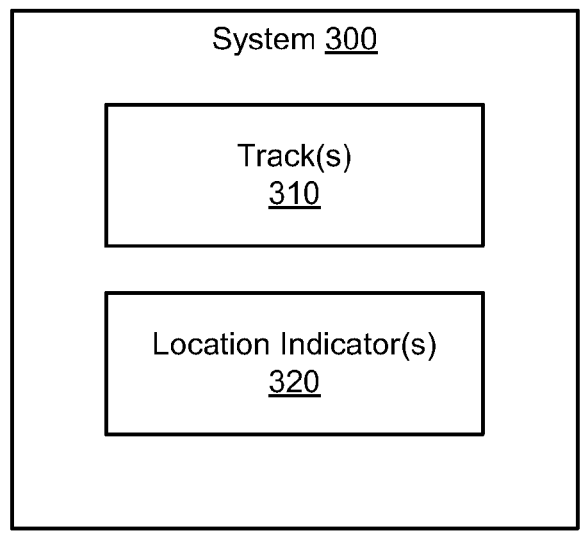
FIG. 3A is a schematic illustration of a positioning system.

FIGS. 3A-3D are schematic illustrations of a positioning system according to one or more aspects of the disclosure. Referring first to FIG. 3A, in some examples, a positioning system 300 includes one or more tracks 310, positioned proximate a structure to be processed. Each of one or more tracks 310 has a length, extending along a first axis, and one or more location indicators 320, positioned along the one or more tracks 310. Each of the location indicators provides a unique tag, which identifies a location of the location indicator along the axis.

Figure 3B:
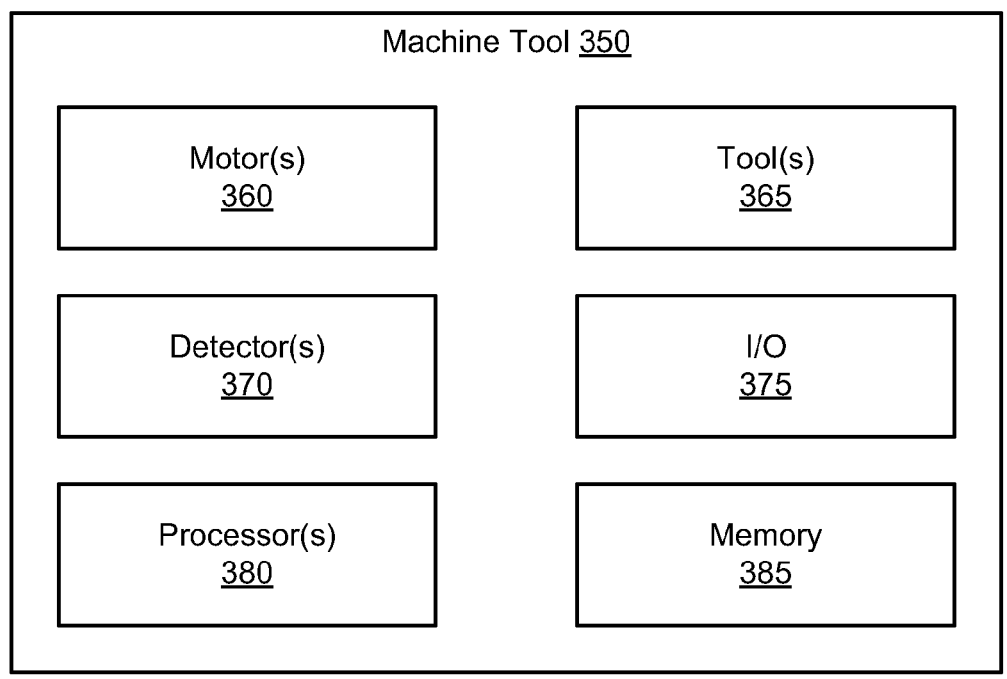
FIG. 3B is a schematic illustration of a machine tool that is adapted to be engaged with a track.

Referring to FIG. 3B, in some examples, at least one machine tool 350 may be adapted to be engaged with the track 310. The machine tool 350 depicted in FIG. 3B, includes one or more motors 360, one or more machine tools 365, one or more detectors 370 to detect the location indicators 320, one or more input/output interfaces 375, one or more processors 380, and one or more computer readable memories 385.

In some examples, motor(s) 360 may be embodied as servo motors and tool(s) 365 may be embodied as computer/numeric controlled (CNC) machine tool(s) and/or robot(s). Tool(s) 365 may be operable to perform various machining operations on a structure.

In one example, I/O interface 375 could be a wired interface, such as an Ethernet interface (see, e.g., Institute of Electrical and Electronics Engineers/IEEE 802.3-2002) or a wireless interface, such as an IEEE 802.11a, b, or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

The processor(s) 380 may be embodied as any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. The specific implementation is not critical.

Memory 385, which may be implemented as random access memory and/or read-only memory or as a file store, may be communicatively coupled to the processor(s) 380. The memory 385 may be internal to machine tool 350 such as, e.g., one or more hard drives, CDROM drives, DVD-ROM drives, or other types of storage devices. In alternate examples, the memory 385 may be external to machine tool 350, such as, e.g., one or more external hard drives, network-attached storage, or a separate storage network.

Figure 3C:
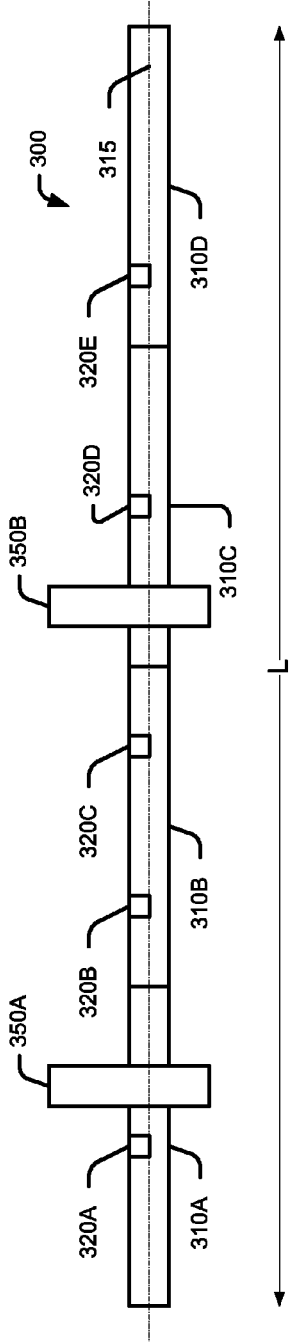
FIG. 3C is a schematic illustration of a positioning system where two machine tools are mounted on a track.

Referring to FIG. 3C, in use, the system 300 may be mounted on a structure 305. By way of example, structure 305 may be a structural component of an aircraft, such as a section of a fuselage, a wing assembly, a tail assembly, floor grid, frame substructure, or the like. In the example depicted in FIG. 3C, the system 300 includes a plurality of track sections 310A, 310B, 310C, 310D, which may be referred to generally herein by reference numeral 310. The track sections 310 may be interconnected and may be secured to the structure 305 by any suitable mechanism. Examples of suitable mechanisms to secure the track sections 310 to the structure 305 include magnets, vacuum assemblies, adhesives, or fixtures such as rivets, screws or the like. The track sections 310 have a length, L, which extends along the axis 315.

In the example depicted in FIG. 3C, two machine tools 350A, 350B are mounted on the track sections 310. The machine tools 350A, 350B may be referred to generally herein by reference numeral 350. The machine tools 350 may be slidably engaged with the track sections 310 and may include one or more motors 360 to move the machine tool 350 along the track 310.

In the examples described herein, the respective track sections 310 include location indicators 320A, 320B, 320C, 320D, 320E which are positioned at predetermined locations along the axis 315 of the track 310. In some examples, the locations at which the location indicators 320 are positioned correspond to locations on the track sections 310 at which the machine tool(s) 350 are to initiate machining operations. By way of example, in some aspects of the disclosure, a particular track section 310 may be mounted at a predetermined location on or proximate the structure 305, such that the location of a respective location indicator 320 correspond to predetermined location on the structure 305. The machine tool(s) 350 may initiate machining operations at predetermined locations.

Figure 3D:
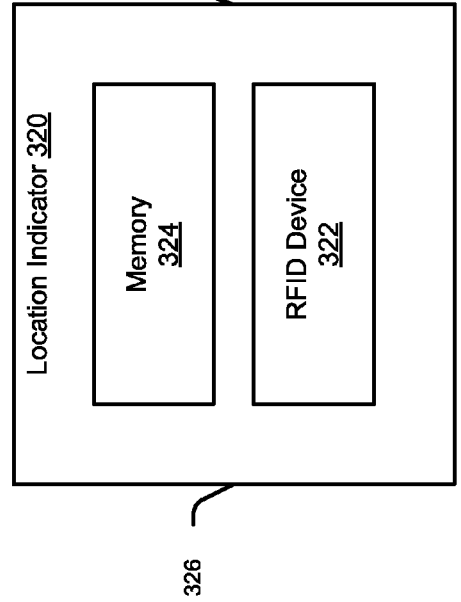
FIG. 3D is a schematic illustration of a location indicator that includes a radio frequency identification (RFID) device and a memory.

Referring to FIG. 3D, in some examples, the location indicators 320 may include a radio frequency identification (RFID) device 322 and a memory 324. The RFID device 322 may be a passive RFID device which responds to a signal from an interrogator or may be an active RFID device which includes, or is coupled to, a power source. In examples in which the RFID device 322 is passive, the detector 370 on the machine tool 350 may include an RFID interrogator. Memory 324 may be embodied as a computer readable memory device, e.g., a read-only memory (ROM) or the like, communicatively coupled to the RFID device 322. Memory 324 may be integrated into the RFID device 322 or may be a separate component.

Figure 4:
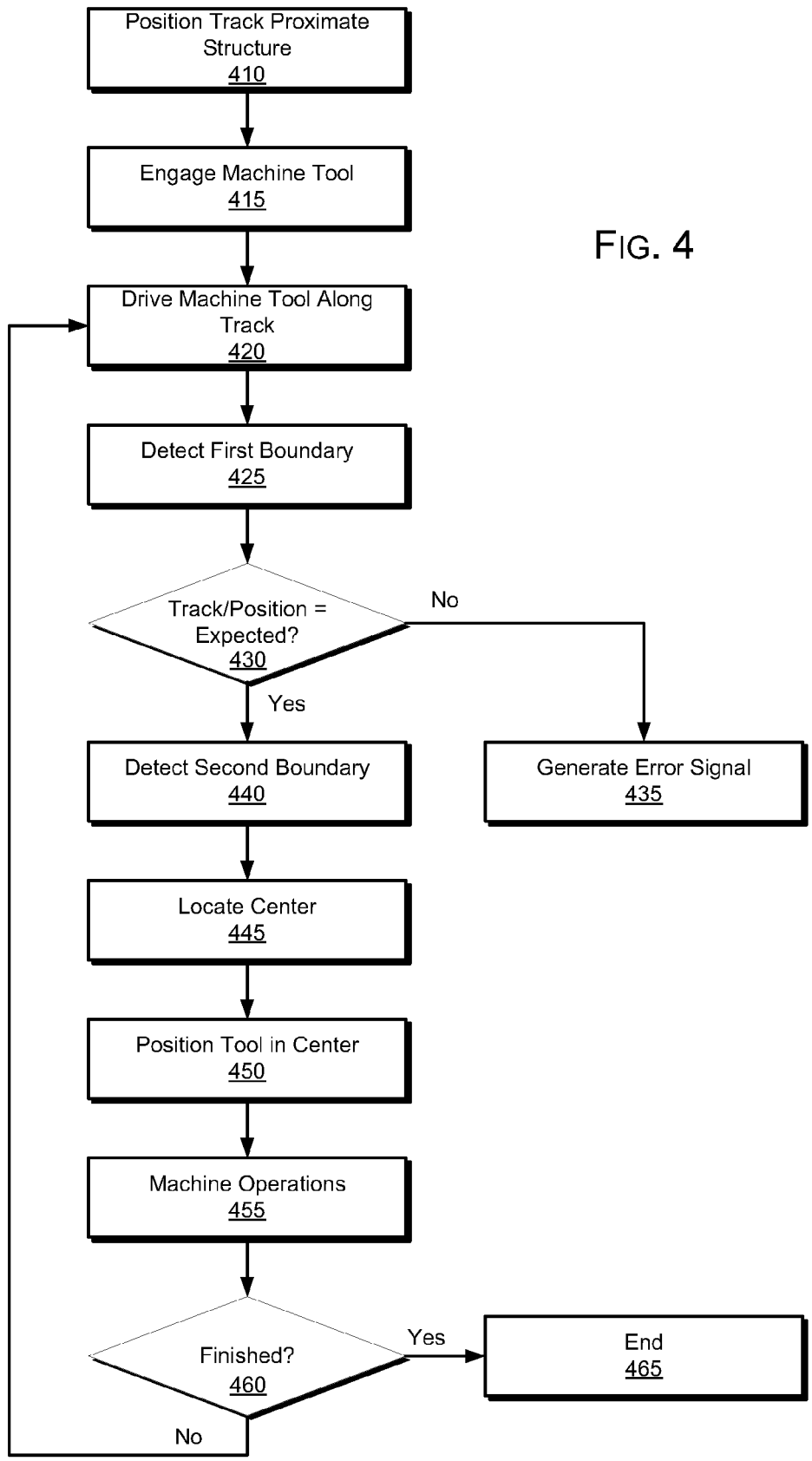
FIG. 4 is a flowchart illustrating a method to position machine tools according to one or more aspects of the disclosure.
Figure 5:
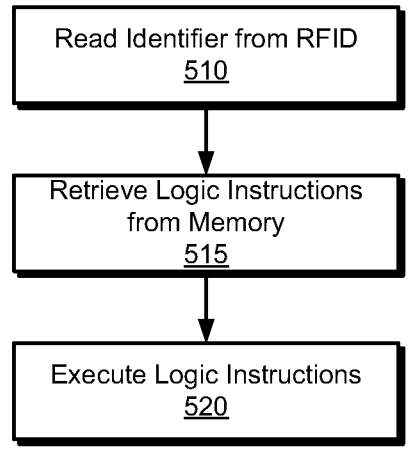
FIG. 5 is a flowchart illustrating a method to utilize information in a memory of an RFID device to obtain logic instructions.
Figure 6:
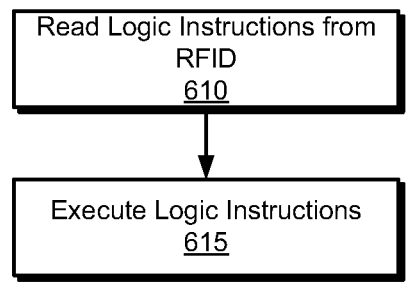
FIG. 6 is a flowchart illustrating a method to obtain logic instructions from a memory.

Having described the various components of the system 300, various operations of the system components will now be described. FIGS. 4-6 are flowcharts, illustrating operations in method according to one or more aspects of the disclosure. The operations depicted in FIGS. 4-6 may be implemented as logic executable by a processor, such as the one or more processors 380 on the machine tool 350.

Referring now to FIG. 4, at operation 410 a track is positioned proximate a structure. In some aspects, such as the example depicted in FIG. 3C, the track includes multiple track sections 310A, 310B, 310C, 310D that are secured to the structure 305 in a predetermined position. In alternate embodiments, a structure, such as a fuselage or other component, may be moved into a predetermined position with respect to a track that is fixed to a structure, such as a factory floor or a rail system.

At operation 415, one or more machine tools are engaged with the track. Referring again to FIG. 3C, in some aspects of the disclosure one or more machine tools 350 may be mounted on the track sections 310 such that the machine tools 350 are slidably engaged with the track. At operation 420, the one or more machine tools are driven along the track. By way of example, a motor 360 may be activated to drive the machine tool along the track 310.

At operation 425, a first boundary of the RFID device 322 is detected. By way of example, the detector 370 in the machine tool may transmit an interrogation signal at a predetermined power level. In some examples, the predetermined power level is sufficiently low that the machine tool 350 must be immediately-adjacent a first edge 326 of the location indicator 320 to receive a return signal from the RFID device 322. When the return signal rises above a predetermined threshold, the detector 370 identifies that location along the axis 315 as the location of the first boundary of the RFID device 322.

When the first boundary is located, the machine tool 350 may implement an algorithm to determine whether the location indicator 320 detected is the location indicator 320 that the machine tool expected to encounter. Referring to FIGS. 3C and 3D, in some examples, the respective track sections 310A-310D may each include at least one location indicator 320. The memory 324 of each location indicator 320 may include information which identifies the track section 310 and may further identify a position along the track section 310. In other words, the memory 324 may include data which includes at least one of a track identifier or a position indicator. The machine tool 350 may retrieve this information from the memory 324 of the location indicator and may compare the retrieved information (the expected value) with the detected track and/or position signal.

For example, a machine tool which begins to traverse the track from the left end of track section 310A, depicted in FIG. 3C, will expect to encounter location indicator 320A, which is associated with track 310A first. However, if the machine tool 350 encounters location indicator 320B first, then the track and/or position signal does not match the expected value. In this event, control passes to operation 435 and an error signal is generated. Operations of the machine tool 350 may be suspended and intervention by an operator may be required to restart the process. This prevents, or at least reduces, the likelihood of the machine tool 350 initiating machining operations in the wrong location on structure 305.

By contrast, if at operation 430 the machine tool 350 first encounters location indicator 320A, then the track and/or position information retrieved from the location indicator 320A will match the expected values and control passes to operation 440.

At operation 440, a second boundary 328 (FIG. 3D) of an RFID device 322 is detected. In some examples, the detector 370 (FIG. 3B) detects when the return signal falls below a predetermined threshold. The detector associates that location along the axis 315 as the location of the second boundary 328 of the RFID device 322.

At operation 445, a center of the location indicator 320 on the axis is located. By way of example, in some aspects of the disclosure, the midway point between the first boundary 326 and the second boundary 328 on the axis may be designated as the center of the location indicator 320. At operation 450, the machine tool 350 is positioned at a location on the axis 315 that corresponds to the center of the location indicator 320.

At operation 455, the machine tool 350 implements machine operations, beginning from the reference point of the center of the location indicator 320. The machine operations may be implemented by logic instructions stored in the memory 385 (i.e., the remote memory device) of the machine tool 350 and executable on one or more of the processors 380 of the machine tool 350. The specific machine operations implemented are not critical and are beyond the scope of this disclosure.

If, at operation 460, machine operations on the structure 305 are finished, then control passes to operation 465 and operations by the machine tool 350 may end. By contrast, if at operation 460, machine operations on the structure 305 are not finished, then control passes back to operation 420 and the machine tool 350 is driven along the track 310.

Thus, operations 425-460 enable the machine tool 350 to move between locations along the track 310 to perform machining operations. The machine tool may generate an error signal when the machine tool 350 encounters a location indicator 320 that is not expected, such as when a track section 310 is assembled incorrectly or when a machine tool is mounted to the track section 310 in an incorrect starting position. By contrast, the machine tool centers over the location indicator 320 when the location indicator 320 matches an expected value.

In some examples, the RFID device 322 of a location indicator 320 may include information which facilitates selection of a control algorithm for the machine tool 350. By way of example, in some aspects of the disclosure, the memory 324 of the RFID device 322 includes an identifier associated with logic instructions for execution at the location of the location indicator 320. In such examples, the machine tool 350 may implement operations to utilize information in the memory 324 of the RFID device 322 to obtain logic instructions.

Referring to FIG. 5, at operation 510 the machine tool 350 reads an identifier from the memory 324 of the location indicator 320. The identifier may be associated with logic instructions for execution at the location of the location indicator in a three-dimensional coordinate system, e.g., a coordinate system of the structure 305. At operation 515, the machine tool 350 may retrieve, from a memory device such as memory 385, the logic instructions for execution at the location of the location indicator 320, and at operation 520 the machine tool 350 may execute the logic instructions in the one or more processors 380.

In further examples, the RFID device 322 of the location indicator 320 may include a control algorithm for the machine tool 350. By way of example, in some aspects of the disclosure, the memory 324 includes logic instructions for execution at the location of the location indicator 320. In such examples, the machine tool 350 may obtain logic instructions from the memory 324.

Referring to FIG. 6, at operation 610 the machine tool 350 reads logic instructions for execution at the location of the location indicator in a three-dimensional coordinate system, e.g., a coordinate system of the structure 305, from the memory 324. At operation 615 the machine tool 350 may execute the logic instructions in the one or more processors 380.

The terms "logic instructions", as referred to herein, relates to expressions which may be understood by one or more machines for performing one or more logic operations. For example, logic instructions may include instructions which are interpretable by a processor compiler for executing one or more operations on one or more data objects. However, this is merely an example of machine-readable instructions and the disclosure is not limited in this respect.

The term "computer readable medium", as referred to herein, relates to media capable of maintaining expressions which are perceivable by one or more machines. For example, a computer readable medium may include one or more storage devices for storing computer readable instructions or data. Such storage devices may include storage media such as, for example, optical, magnetic or semiconductor storage media. However, this is merely an example of a computer readable medium and the disclosure is not limited in this respect.

The term "logic", as referred to herein, relates to structure for performing one or more logic operations. For example, logic may include circuitry which provides one or more output signals based upon one or more input signals. Such circuitry may include a finite-state machine which receives a digital input and provides a digital output, or circuitry which provides one or more analog output signals in response to one or more analog input signals. Such circuitry may be provided in an application-specific integrated circuit (ASIC) or field-programmable gate array (FPGA). Also, logic may include machine-readable instructions stored in a memory in combination with processing circuitry to execute such machine-readable instructions. However, these are merely examples of structures which may provide logic and the disclosure is not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on an application-specific integrated circuit (ASIC), e.g., a field-programmable gate array (FPGA) or the like.

In the description and claims, the terms "coupled" and "connected", along with their derivatives, may be used. In particular examples, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be referring to the same example.

Although aspects of the disclosure have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A system, comprising:
   a track;
   a location indicator coupled to the track; and
   a device moveably coupled to the track, wherein the device includes a location detector,
     and wherein the device is configured to:
       move in a first direction along the track;
       detect, via the location detector, a first location of a first boundary of a communication range of the location indicator;
       detect, via the location detector, a second location of a second boundary of the communication range;
       determine a target location based on the first location and the second location;
       after detecting the second location of the second boundary of the communication range, move in a second direction along the track so that a particular portion of the device corresponds to the target location, wherein the second direction is opposite of the first direction; and
       in response to the particular portion of the device corresponding to the target location, stop moving along the track.

2. The system of claim 1, wherein the device comprises a motor, and wherein the device moves along the track by activating the motor.

3. The system of claim 1, wherein the particular portion corresponds to a center of the device.

4. The system of claim 1, wherein the target location is a midpoint between the first location and the second location.

5. The system of claim 1, wherein the location indicator is an RFID device.

6. The system of claim 1, wherein the location detector is an RFID detector.

7. The system of claim 1, wherein the location indicator indicates a particular location of a work piece, and wherein the target location corresponds to a location for the device to perform a particular operation on the work piece.

8. The system of claim 1, wherein the location indicator is configured to transmit a signal that identifies a section of the track corresponding to the location indicator.

9. A method, comprising:
   moving a device in a first direction along a track;
   detecting, via a location detector, a first location of a first boundary of a communication range of a location indicator coupled to the track;
   detecting, via the location detector, a second location of a second boundary of the communication range;
   determining a target location based on the first location and the second location;
   after detecting the second location of the second boundary of the communication range, moving the device in a second direction along the track so that a particular portion of the device corresponds to the target location, wherein the second direction is opposite of the first direction; and
   in response to the particular portion of the device corresponding to the target location, stopping movement of the device along the track.

10. The method of claim 9, further comprising performing a machining operation using the device.

11. The method of claim 10, wherein the machining operation is selected based on a location identifier received from the location indicator.

12. The method of claim 9, further comprising comparing a location identifier from the location indicator to an expected identifier.

13. The method of claim 12, further comprising generating an error signal in response to the location identifier not matching the expected identifier.

14. The method of claim 9, wherein the first location is detected when a signal strength of a signal transmitted by the location indicator as detected by the location detector satisfies a threshold.

15. The method of claim 14, wherein the second location is detected when the signal strength of the signal as detected by the location detector does not satisfy the threshold after having satisfied the threshold.

16. The method of claim 9, further comprising identifying a particular operation for the device to perform based on a location identifier received from the location indicator.

17. The method of claim 9, wherein the target location is a center point between the first location and the second location.

18. A non-transitory computer-readable medium comprising instructions that, when executed by a processor, cause the processor to perform operations comprising:

initiating movement of a device in a first direction along a track;

detecting, via a location detector, a first location of a first boundary of a communication range of a location indicator associated with the track;

detecting, via the location detector, a second location of a second boundary of the communication range;

determining a target location based on the first location and the second location;

after detecting the second location of the second boundary of the communication range, initiate movement of the device in a second direction along the track so that a particular portion of the device corresponds to the target location, wherein the second direction is opposite of the first direction; and in response to the particular portion of the device corresponding to the target location, stopping movement of the device along the track.

19. The non-transitory computer-readable medium of claim 18, wherein the operations further comprise performing a machining operation using the device.

20. The non-transitory computer-readable medium of claim 18, wherein the operations further comprise identifying a particular task for the device to perform based on a location identifier received from the location indicator.

* * * * *